United States Patent [19]
Bordwell et al.

[11] Patent Number: 6,066,805
[45] Date of Patent: May 23, 2000

[54] ELECTRICAL RECEPTACLE COVER HAVING AN INTEGRALLY FORMED DETACHABLE FASTENING NUT

[75] Inventors: Mark Bordwell, Memphis; James McCutcheon, Athens; Darrell Dumont, Englewood; Jessica Henderson, Memphis, all of Tenn.

[73] Assignee: Thomas & Betts Corporation, Memphis, Tenn.

[21] Appl. No.: 08/454,047

[22] Filed: May 30, 1995

[51] Int. Cl.$^7$ ........................................................ H02G 3/14
[52] U.S. Cl. ................................. 174/66; 174/55; 220/3.8
[58] Field of Search .................................. 174/66, 50.51, 174/53, 55; 220/3.2, 3.3, 3.8, 3.92, 3.94; 248/906, 316.7, 229.76, 230.72, 231.8; 24/563, 569

[56] References Cited

U.S. PATENT DOCUMENTS

| | | | |
|---|---|---|---|
| 2,031,689 | 2/1936 | Buckels | 247/21 |
| 2,828,882 | 4/1958 | Karlin | 220/3.92 |
| 2,934,590 | 4/1960 | Thompson | 174/66 |
| 3,437,737 | 4/1969 | Wagner | 174/66 |
| 3,526,703 | 9/1970 | Tucker | 174/53 |
| 4,642,420 | 2/1987 | Nattel | 220/3.2 |
| 4,987,761 | 1/1991 | Saccoccio | 72/335 |
| 5,180,886 | 1/1993 | Dierenbach | 220/241 |

*Primary Examiner*—Hyung S. Sough
*Assistant Examiner*—Dhiru R Patel
*Attorney, Agent, or Firm*—MIchael L. Hoelter; Salvatore J. Abbruzzese

[57] ABSTRACT

An electrical receptacle cover is securable over an electrical receptacle. The cover includes a generally planar cover plate for positioning over the receptacle. The cover plate includes an outlet opening therethrough for accessing the outlet of the electrical receptacle. The cover plate also includes an aperture therethrough for passage of a threaded fastening element. A threaded nut-like securement member is formed integrally with the planar cover plate. The securement member is frangibly removable so that it may be attached to the receptacle for accommodating the fastening element extending through the cover plate.

18 Claims, 3 Drawing Sheets

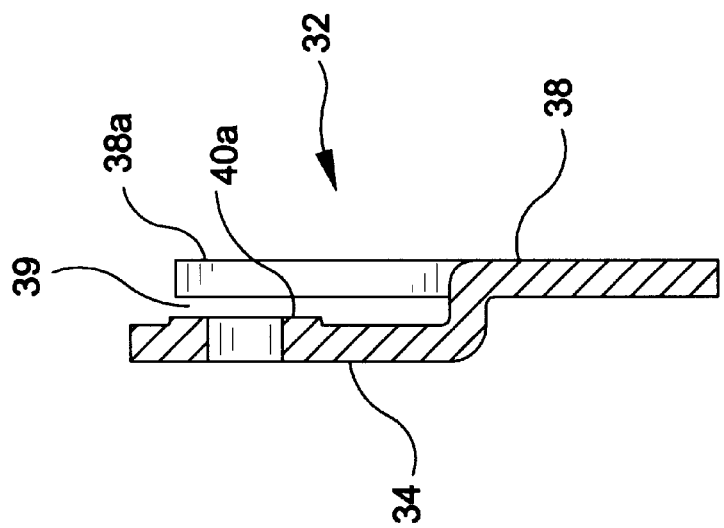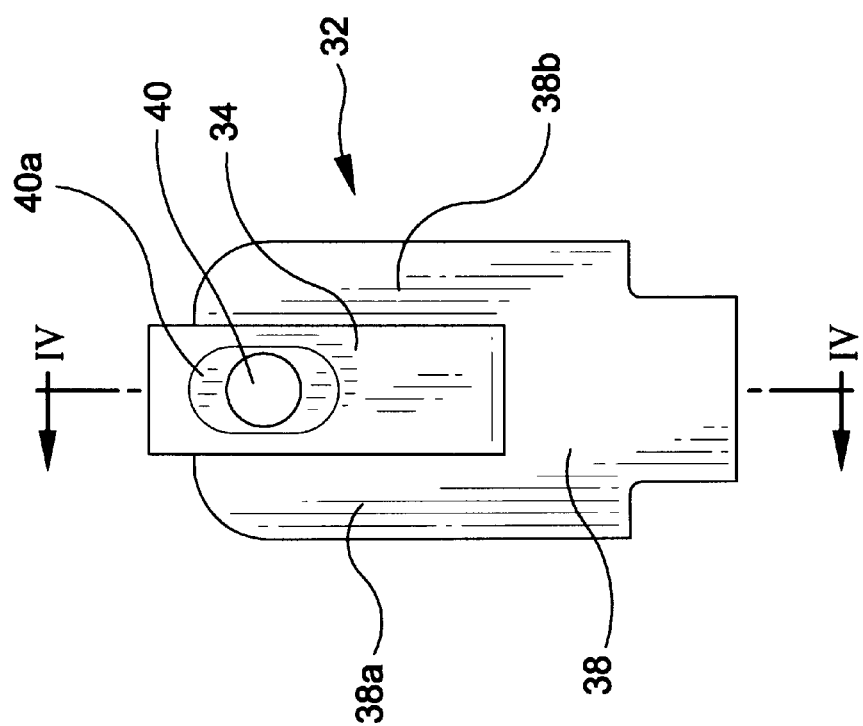

ELECTRICAL RECEPTACLE COVER HAVING AN INTEGRALLY FORMED DETACHABLE FASTENING NUT

FIELD OF TEE INVENTION

The present invention relates generally to covers for electrical receptacles. More particularly, the present invention relates to a raised cover for an electrical receptacle which includes detachably removable integrally formed fastening nuts which may be captively supported on the receptacle.

BACKGROUND OF THE INVENTION

In use, electrical receptacles are supported in a junction or outlet box where the ends of electric cable may be terminated to the receptacle. A receptacle face plate or cover is placed over the receptacle to prevent access to the terminations. The cover, which may be secured to the box or to the receptacle, has outlet openings therethrough which permit interconnection access to the outlets of the electrical receptacle.

One common receptacle type is a duplex receptacle which includes a pair of spaced outlets. The cover would similarly have a pair of outlet openings. A fastening screw may be passed through the center of the receptacle cover and into a threaded aperture in the front face of the receptacle between the spaced apart outlets. In situations where a flat cover is employed and where the receptacle is mounted in the box, the single screw is usually sufficient to suitably secure the receptacle cover to the receptacle.

In certain applications, covers have been designed which allow the surface of the cover to be spaced or raised from the outlet box. This increases the useable volume of the box, permitting additional interconnections. In these applications, the National Electrical Code (NEC) requires that the receptacles be secured to the raised cover by more than a single screw. The cover may then be mounted to the box.

This prohibition against using a single central screw to secure the cover to the receptacle requires the installer to employ additional fastening screws, and more troublesome, the use of fastening nuts to secure the screws. The need for additional securement hardware, in addition to increasing installation time, requires the installer to obtain the hardware and manipulate the hardware to fasten the cover to the receptacle. In most applications, this requires the installer to hold the nut behind the receptacle, pass the threaded screw through the cover and the receptacle, and then thread the screw through the nut so as to secure the cover to the receptacle. The installer must manipulate the nut, screw and screwdriver at the same time in order to make an installation. This must be done in at least two locations. During the installation procedure, there is the potential for the installer to drop the nut, thereby making installation of the cover more time-consuming.

Further, the nuts used to secure the cover are separate elements. They must either be supplied with the cover or must be provided by the installer at the site. In either situation, the installed cost of the cover is increased.

Accordingly, it is desirable to provide a receptacle raised cover which may be secured to an electrical receptacle without need for additionally provided parts, and which may be easily installed by the installer.

SUMMARY OF THE INVENTION

It is an object of the present invention to provide a cover securable over an electrical receptacle.

It is a further object of the present invention to provide an electrical receptacle cover having a threaded nut-like securement member which may be detachably removed from the cover and used in combination with a threaded screw to secure the cover to the receptacle.

It is a still further object of the present invention to provide a cover for an electrical receptacle where the nut-like securement member is integrally formed with the cover and may be frangibly removed therefrom and attached to the receptacle for use in securing the cover to the receptacle.

In the efficient attainment of these and other objects, the present invention provides a cover for an electrical receptacle. The receptacle includes an electrical outlet. The cover is securable over the receptacle by a fastening element such as a screw which is insertable through the cover. The cover further includes a generally planar cover plate for positioning over the receptacle. The cover plate includes an outlet opening therethrough for accessing the electrical outlet. The cover further includes an aperture therethrough for passage of the fastening element. A removable securement member formed integrally with the planar cover plate is frangibly removable for attachment to the receptacle. The securement member accommodates the fastening element extending through the cover plate to secure the cover plate to the receptacle.

As more specifically described by way of the preferred embodiment herein, the removable securement member extends into the outlet opening and may be removed therefrom and attached to the receptacle. The securement member includes a clip which enables the securement member to be clipped onto the receptacle and remain in place while the cover is positioned over the receptacle. The fastening element is then insertable through the cover member and into the securement member to secure the cover member to the receptacle.

In the formation of the planar cover, the outlet opening is formed by stamping out a portion of the cover plate. The removable securement member may be formed in the outlet opening during such stamping process.

BRIEF DESCRIPTION OF THE DRAWINGS

FIG. 3 is an enlarged top plan view of one of the securement members of FIG. 2.

FIG. 4 is a vertical cross-section of the portion of the securement member of FIG. 3 taken through the lines IV—IV thereof.

DETAILED DESCRIPTION OF THE PREFERRED EMBODIMENT

Figure 1:
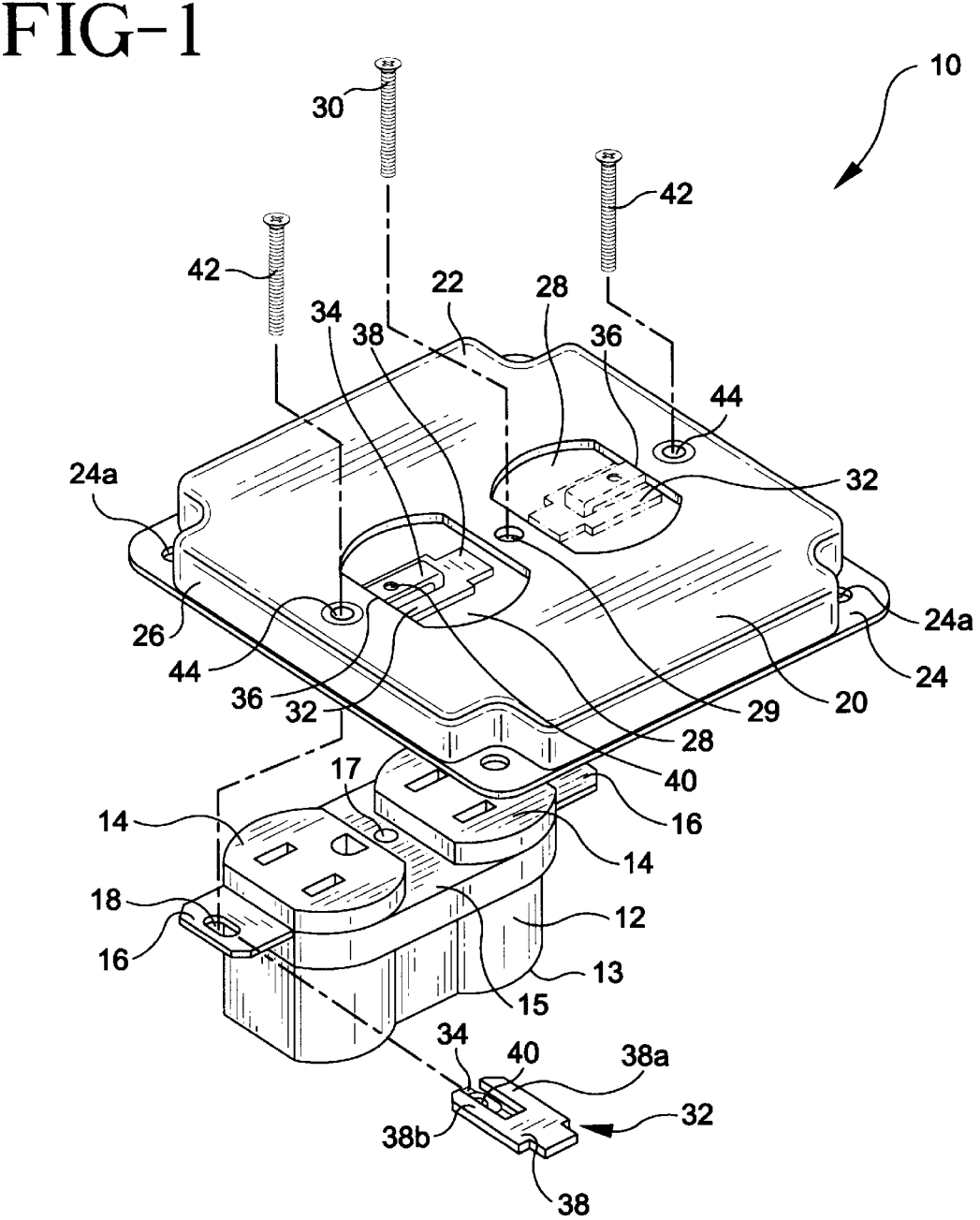
FIG. 1 is an exploded perspective view of a receptacle cover of the present invention shown positioned over an electrical receptacle.

With reference to FIG. 1, a receptacle cover plate assembly 10 of the present invention is shown. Cover plate assembly 10 is used to cover an electrical receptacle 12 which is typically housed in an outlet or junction box (not shown). Electrical receptacle 12 may terminate, in conventional fashion, electrical cables (also not shown) adjacent a rear face 13 thereof. The particular receptacle 12 shown in FIG. 1 is a conventional duplex receptacle having a pair of vertically spaced receptacle outlets 14 extending from a front face 15 thereof. Extending vertically outwardly at each end of receptacle 12 are a pair of mounting tabs 16 having a central enlarged opening 18 therethrough.

In many applications, duplex receptacle 12 is mounted in and secured to the junction box. The mounting tabs 16 may be used to provide such securement. Threaded fasteners such as bolts or screws 42, which are typically provided with receptacle 12, may be inserted into the apertures 18 of mounting tabs 16 and into aligned threaded openings in the junction box so as to secure the receptacle 12 thereto.

In certain instances, where it is desirable to increase the useable space within the junction box, a raised cover plate 20 may be employed over the receptacle 12. In those instances, the electrical receptacle 12 is secured to the raised cover plate 20 rather than to the junction box, thereby moving the receptacle 12 forward and effectively increasing the useable box volume. The present invention provides a cover plate assembly 10 for raised cover applications.

Cover plate assembly 10 of the present invention includes a cover plate 20 and a centrally located bolt or screw 30. Cover plate 20 includes a generally rectangular planar face plate surface 22 which is parallel to and raised from a perimetrical lower surface 24 extending therearound. A perimetrical side wall 26 extends between face plate surface 22 and lower surface 24 and defines a raised area therein for receipt and accommodation of electrical receptacle 12. The perimetrical surface 24 includes four screw holes 24a, one extending through each corner. The cover plate 20 may also be secured to the junction box using the screw holes 24a in conventional fashion.

In the present illustrative embodiment, cover plate 20 is manufactured from stamped and formed sheet metal and includes a pair of aligned, spaced apart outlet openings 28 stamped therefrom. Outlet openings 28 have a shape which generally conforms to the shape of outlets 14 so as to provide connection access thereto for electrical plugs and the like. Raised face plate surface 22 also includes a central aperture 29 therethrough which is positioned between outlet openings 28. Aperture 29 is alignable with a conventional screw-threaded aperture 17 centrally located between outlets 14 on front face 15 of electrical receptacle 12. In conventional fashion, the threaded bolt or screw 30 may be passed through aperture 29 and into threaded aperture 17 for securing cover plate 20 to receptacle 12.

As mentioned above, recent changes in the National Electrical Code (NEC) require that a raised cover plate of the type shown herein be secured to the receptacle by more than a single screw. Accordingly, the present invention includes provisions for use of the bolts or screws 42 for securing cover plate 20 to electrical receptacle 12.

Figure 2:
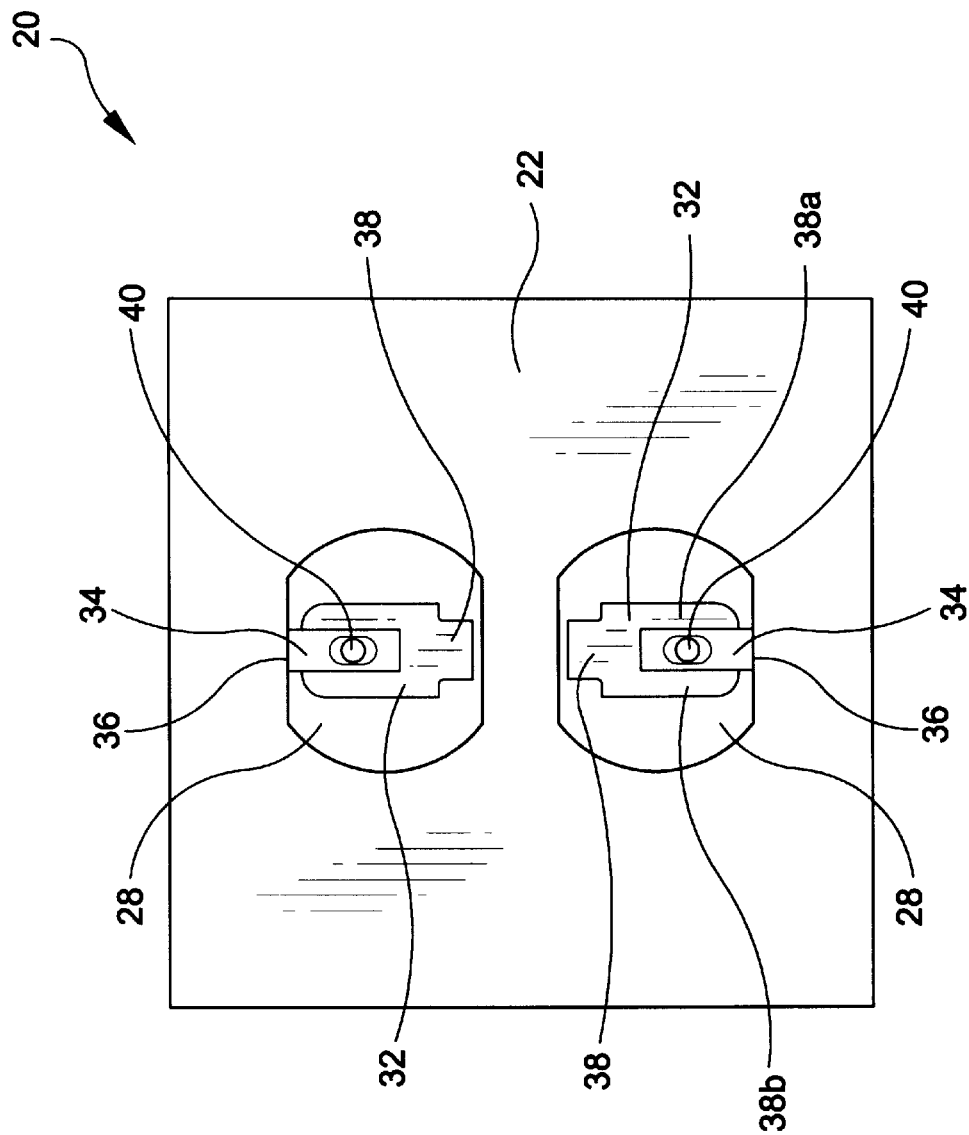
FIG. 2 is a top plan view of the electrical receptacle cover of FIG. 1 showing securement members formed therewith.

Referring additionally to FIGS. 2–4, the particular cover plate of the present invention may be described in further detail. As mentioned above, outlet openings 28 formed in raised surface 22 of cover plate 20 are typically formed by a stamping process. A die is brought down over the formed cover plate to stamp out the portions of the raised surface 22 so as to define openings 28. These stamped-out portions (not shown) are generally discarded as scrap during the manufacturing process. The present invention contemplates use of particularly configured stamping dies which, upon stamping face plate surface 22 to form each outlet opening 28, forms a detachable nut or securement clip 32 therein.

Securement clip 32 is an elongate member which is integrally formed with cover plate 20. As particularly shown in FIG. 3 and 4, securement clip 32 includes a elongate tongue 34 which is attached at one end to face plate surface 22 at a score line 36 forming part of the boundary of outlet opening 28. Elongate tongue 34 lies generally in the plane of face plate surface 22. Securement clip 32 further includes a base 38 which is spaced from the plane containing tongue 34 and extends therefrom distally into outlet opening 28.

Tongue 34 and base 38 are formed in the same stamping operation. Tongue 34 is formed from a central portion of base 38 which includes a pair of spaced apart coplanar legs 38a and 38b with tongue 34 lying above and centrally therebetween. Tongue 34 and base 38 define therebetween a recess 39, the purpose of which will be described in further detail hereinbelow. Tongue 34 further includes a centrally located screw-threaded aperture 40 extending therethrough. Aperture 40 is constructed for the screw accommodation of threaded fastening members such as bolts or screws 42 (FIG. 1). Tongue 34 further includes an oval-shaped raised bump 40a about aperture 40. As shown in FIG. 4, bump 40a extends slightly into recess 39 formed between tongue 34 and base 38.

While integrally formed with cover plate 20, securement clip 32 is attached to raised surface 22 along score line 36 at the end of tongue 34. As such, tongue 34 may be easily frangibly detached therefrom so as to remove securement clip 32 from cover plate 20 for further use in accordance with the present invention.

Having described the components of the cover plate assembly 10 of the present invention, its use in combination with electrical receptacle 12 may now be described with reference to FIG. 1.

Cover plate assembly 10 is typically provided with cover plate 20 formed as shown in FIG. 2 and may be packaged along with central bolt or screw 30. Initially, an electrical installer would terminate wires extending from a junction or outlet box using a standard receptacle 12 in conventional fashion. The terminated receptacle 12 would then be pulled partially outward of the junction box to permit installation of cover plate 20. Prior to attaching cover plate 20 over the front face 15 of receptacle 12, the installer would break off and remove securement clips 32 lying across outlet openings 28. The frangible attachment of tongue 34 to cover plate surface 22 allows easy detachment of the clips 32 therefrom. The installer may use a pair of pliers to effect such detachment.

The securement clips 32 are then attached to the mounting tabs 16 of receptacle 12. The securement clips are inserted over each tab so that each tab 16 is positioned within the space 39 created between tongue 34 and legs 38a and 38b. The securement clips 32 are specifically constructed so that the clips are frictionally retained on mounting tabs 16 with aperture 18 thereof in alignment with threaded aperture 40 of clips 32. The oval-shaped bump 40a of each tongue 34 becomes seated in each enlarged aperture 18 of tab 16. This helps retain the clips 32 on tab 16. Upon such insertion, an audible sound, such as a snap, may be emitted, thereby providing indication that proper alignment between tabs 16 and clip 32 is achieved. The clips 32 will remain frictionally attached to mounting tabs 16 without further need for the installer to manually hold the clips in place. Once the clips 32 are positioned as described above, the cover plate 20 may be installed over front face 15 of receptacle 12. The raised outlets 14 extend through outlet openings 28 and properly align and position the cover plate 20 with respect to receptacle 12.

In proper position, threaded receptacle aperture 17 is aligned with central aperture 29 of cover plate 20 and in conventional fashion, a central threaded screw 30, which may also be supplied along with cover plate 20, is used to secure cover plate 20 to receptacle 12. In compliance with the requirements of the NEC, additional screws 42 may be used to secure cover plate 20 to receptacle 12. In order to accommodate screws 42, cover plate 20 includes a pair of additional cover plate apertures 44 which are positioned for alignment with apertures 18 of mounting tabs 16 when cover plate 20 is properly positioned over receptacle 12. Screws 42 are inserted through apertures 44 and cover plate surface 22 and into and through apertures 18 of mounting tabs 16. The screws 42 then become threadingly engaged with the threaded aperture 40 of securement clip 32 which is attached to mounting tabs 16. Continued screw tightening of screws 42 further secures cover plate 20 to receptacle 12 and also serves to retain securement clips 32 on mounting tabs 16. In this fashion, securement clips 32 function as captivated nuts which secure screws 42. Thus, cover plate 20 is secured to receptacle 12 with screws 42 in addition to the central screw 30 of conventional practice. Once cover plate 20 is secured to receptacle 12, the cover plate may be further secured to the junction box through screw holes 24a.

It is contemplated that since the present invention provides two securement screws 42 attachable to securement clips 32 at mounting tabs 16, the use of central screw 30 is optional. Thus cover plate 20 may be formed without central aperture 29 between outlet openings 28.

The present invention allows the installer to comply with the requirements of the NEC by employing more than a single screw to secure cover plate 20 to receptacle 12. The present invention permits such installation without need for the installer to hold the nut, screw and screwdriver at the same time while attempting to install the cover. By providing captivated securement clips 32, the installation of cover plate 20 becomes less cumbersome. Further, as the securement clips are formed from portions of the cover plate 20 which are discarded as scrap, the securement clips 32 add little or no additional cost to cover plate assembly 10.

The present invention is described in the preferred embodiment shown herein as a cover plate assembly for a duplex electrical receptacle. It, however, may be appreciated that other configurations of cover plates are within the contemplation of the present invention. The present invention may also be employed with configurations such as single outlet receptacles, multiple duplex receptacles, switch and receptacles and the like. It is also contemplated that ground fault circuit interrupters (GFCI) may also be employed in combination with the present invention.

Various changes to the foregoing described and shown structures would now be evident to those skilled in the art. Accordingly, the particularly disclosed scope of the invention is set forth in the following claims.

What is claimed is:

1. A cover for an electrical receptacle, said receptacle having at least one outlet, said cover being securable over said receptacle by a fastening element insertable through said cover, said cover comprising:
   a generally planar cover plate for positioning over said receptacle, said cover plate including at least one outlet opening therethrough for accessing said at least one outlet and a plate aperture therethrough for accommodating therethrough said fastening element; and
   at least one securement member formed integrally with said planar cover plate, said at least one securement member being frangibly removable for attachment to said receptacle for accommodating said fastening element extending through said cover plate.

2. A cover of claim 1 wherein said at least one securement member extends into said at least one outlet opening.

3. A cover of claim 1 wherein said fastening element is a threaded screw and wherein said at least one securement member further includes a threaded aperture therethrough for accommodating said threaded screw.

4. A cover of claim 3 wherein said at least one securement member includes a clip portion, said clip portion being frictionally attachable to said receptacle.

5. A cover of claim 4 wherein said threaded aperture extends through said clip portion.

6. A cover of claim 4 wherein said at least one securement member lies in a plane generally coplanar with said planar cover.

7. A cover of claim 6 wherein said at least one securement member is elongate having a frangible end attached to said cover plate and a distal end extending into said at least one outlet opening.

8. A cover of claim 1 wherein said at least one outlet is a pair of spaced apart outlets and a pair of oppositely extending mounting tabs having tab apertures therethrough and wherein said at least one outlet opening includes a pair of outlet openings and said plate aperture and an additional plate aperture alignable with said tab apertures.

9. A cover of claim 8 further including a pair of securement members, one extending into each of said outlet openings of said cover plate.

10. A cover of claim 9 wherein said pair of securement members are captively attachable to said pair of mounting tabs of said receptacle.

11. A cover for securement over an electrical receptacle, said receptacle including a front face having at least one electrical outlet and at least one securement tab adjacent the front face, said cover comprising:
    a planar cover surface positionable over the front face of said receptacle, said cover surface having at least one outlet opening therethrough for providing interconnection access to said at least one outlet and at least one cover surface aperture aligned with said at least one securement tab of said receptacle for passage of a threaded fastener therethrough; and
    at least one fastener securement member detachably formed with said cover, and including a clip portion which is securable to said at least one securement tab of said receptacle upon detachment of said at least one securement member from said cover, said clip portion including a threaded aperture therethrough for screw accommodation of said threaded fastener for securing said cover to said receptacle.

12. A cover of claim 11 wherein said at least one outlet opening is stamped from said planar cover surface.

13. A cover of claim 11 wherein said at least one fastener securement member extends into said at least one outlet opening.

14. A cover of claim 11 wherein said receptacle is a duplex receptacle and said at least one outlet is a pair of spaced apart outlets, said cover being securable to said receptacle with a central screw extending between said pair of outlets.

15. A cover of claim 14 wherein said at least one securement tab includes a pair of securement tabs and wherein said at least one outlet opening includes a pair of outlet openings, said at least one cover surface aperture is a pair of cover surface apertures and said at least one fastener securement member is a pair of fastening securement members, one extending into each of said outlet openings.

16. A cover of claim 15 wherein each of said fastening securement members is securable to one of said securement tabs.

17. A cover assembly for an electrical receptacle having an outlet and an extending mounting tab, said cover assembly comprising:

a planar cover plate positionable over said receptacle, said cover plate having an outlet opening therein for accommodating said outlet and a cover plate aperture therethrough;

a fastener clip captively attachable to said mounting tab of said receptacle, said fastener clip having a threaded clip aperture therethrough, said fastener clip being detachably secured to said cover plate; and an elongate threaded fastener insertable through said cover plate aperture and into said threaded clip aperture for securing said cover plate to said receptacle.

18. A cover assembly of claim 17 wherein said fastener clip is integrally formed with said cover plate for frangible removal therefrom.

* * * * *